United States Patent
Allen et al.

(10) Patent No.: US 11,132,281 B2
(45) Date of Patent: *Sep. 28, 2021

(54) APPLYING CONSISTENT LOG LEVELS TO APPLICATION LOG MESSAGES

(71) Applicant: INTERNATIONAL BUSINESS MACHINES CORPORATION, Armonk, NY (US)

(72) Inventors: Corville O. Allen, Morrisville, NC (US); Andrew R. Freed, Cary, NC (US); Scott N. Gerard, Wake Forest, NC (US); Dorian B. Miller, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/359,326

(22) Filed: Mar. 20, 2019

(65) Prior Publication Data

US 2019/0220385 A1 Jul. 18, 2019

Related U.S. Application Data

(63) Continuation of application No. 15/245,673, filed on Aug. 24, 2016, now Pat. No. 10,318,405.

(51) Int. Cl.
*G06F 11/07* (2006.01)
*G06F 11/36* (2006.01)
(Continued)

(52) U.S. Cl.
CPC .......... *G06F 11/3636* (2013.01); *G06F 11/07* (2013.01); *G06F 11/0781* (2013.01);
(Continued)

(58) Field of Classification Search
CPC ............. G06F 11/3495; G06F 11/3476; G06F 11/2257; G06F 11/0793; G06F 11/0703;
(Continued)

(56) References Cited

U.S. PATENT DOCUMENTS 5,873,056 A * 2/1999 Liddy .................. G06F 16/313
704/9
6,278,996 B1 * 8/2001 Richardson .......... G06Q 10/107
(Continued)

OTHER PUBLICATIONS

Runeson, "Detection of Duplicate Defect Reports Using Natural Language Processing", 2007. IEEE, pp. 1-10 (Year: 2007).*
(Continued)

*Primary Examiner* — Yolanda L Wilson
(74) *Attorney, Agent, or Firm* — Tutunjian & Bitetto, P.C.; Ingrid M. Foerster

(57) ABSTRACT

A method is provided for analyzing log message content. The computer-implemented method may include detecting, by at least one processor, log messages in an application code, identifying a log level assigned to each of the log messages, and performing natural language processing (NLP) analysis on each of the log messages by using at least keyword and synonym matching percentage analysis criteria. The computer-implemented method may further include determining, in response to the NLP analysis, a severity score of each of the log messages, and reclassifying, based on the severity score, the assigned log level of one or more of the log messages to a different log level.

20 Claims, 8 Drawing Sheets

(51) Int. Cl.
*G06F 40/211* (2020.01)
*G06F 40/247* (2020.01)

(52) U.S. Cl.
CPC ........ *G06F 11/3664* (2013.01); *G06F 40/211* (2020.01); *G06F 40/247* (2020.01)

(58) Field of Classification Search
CPC ........... G06F 17/2785; G06F 17/30587; G06F 17/279; G06F 17/271; G06F 17/28; G06F 17/2881; G06F 11/3636; G06F 11/3664; G06F 11/0781; G06F 11/07; G06F 40/247; G06F 40/211; G06F 40/30; G06N 5/022; G06N 5/04; G06N 99/005; G06N 3/004
See application file for complete search history.

(56) References Cited

U.S. PATENT DOCUMENTS

| | | | | |
|---|---|---|---|---|
| 6,594,684 | B1* | 7/2003 | Hodjat | G06N 5/043 709/202 |
| 8,321,433 | B1 | 11/2012 | Klinker et al. | |
| 8,327,324 | B1 | 12/2012 | Going et al. | |
| 9,411,672 | B1* | 8/2016 | Cooper | H04L 41/16 |
| 9,665,826 | B2* | 5/2017 | Jain | G06F 16/2465 |
| 10,101,822 | B2* | 10/2018 | Hatori | G06F 3/0237 |
| 2008/0148239 | A1* | 6/2008 | Petrov | G06F 11/3636 717/128 |
| 2009/0119095 | A1* | 5/2009 | Beggelman | G06F 40/30 704/9 |
| 2009/0248399 | A1* | 10/2009 | Au | G06F 40/20 704/9 |
| 2010/0005081 | A1* | 1/2010 | Bennett | G06F 16/3344 704/9 |
| 2011/0067008 | A1* | 3/2011 | Srivastava | G06F 11/3636 717/128 |
| 2013/0268262 | A1* | 10/2013 | Moilanen | G06F 40/30 704/9 |
| 2014/0006861 | A1* | 1/2014 | Jain | G06N 5/022 714/26 |
| 2014/0149576 | A1* | 5/2014 | Pavlov | G06F 11/0781 709/224 |
| 2014/0157288 | A1* | 6/2014 | Wong | G06F 9/542 719/318 |
| 2015/0066814 | A1* | 3/2015 | Allen | G06F 40/30 706/11 |
| 2015/0378724 | A1* | 12/2015 | Balachandran | G06F 8/75 717/123 |
| 2016/0092295 | A1* | 3/2016 | Rajkovic | G06F 11/3476 714/49 |
| 2016/0371132 | A1* | 12/2016 | Prabhakara | G06F 11/0709 |
| 2017/0168914 | A1* | 6/2017 | Altman | G06F 11/3476 |
| 2017/0168917 | A1* | 6/2017 | Doi | G06F 11/3636 |
| 2018/0232641 | A1* | 8/2018 | Bostick | G06Q 50/01 |
| 2019/0158366 | A1* | 5/2019 | Higgins | G06Q 10/06313 |
| 2019/0220385 | A1* | 7/2019 | Allen | G06F 11/3664 |
| 2019/0251492 | A1* | 8/2019 | Bender | G06N 5/025 |
| 2019/0286628 | A1* | 9/2019 | Zhou | G06F 11/0751 |

OTHER PUBLICATIONS

Kochhar, "Automatic Fine-Grained Issue Report Reclassification", 2014, IEEE, pp. 1-10 (Year: 2014).*
Oliner, "Advances and Challenges in Log Analysis", Feb. 2012, ACMQueue, pp. 55-61 (Year: 2012).*
Pazienza, "Towards Scalable, Adaptable Systems", 1998, Springer, pp. 1-175 (Year: 1998).*
Suryakand "Integration of bug tracking system(Bugzilla) with IDE (Eclipse)", Jan. 2008, http://suryakand-shinde.blogspot.com/2008/01/integration-of-bug-tracking.html, pp. 1-5 (Year: 2008).*
Eclipsepedia, "Mylyn/User Guide", 2008, www.wiki.eclipse.org, pp. 1-21 (Year: 2008).*
Crowstona, "Using natural language processing technology for qualitative data analysis", May 2010, Syracuse University, pp. 1-30 (Year: 2010).*
Kerslake, R., "Getting started with semantic logging", Online Article. http://blogs.endjin.com. Published Apr. 7, 2014. pp. 1-5.
Aug. 24, 2016, U.S. Appl. No. 15/245,673, 2018-0060211.
List of IBM Patents or Patent Applications Treated as Related dated Mar. 20, 2019, 2 pages.

* cited by examiner

600

610 dictionaries of words/n-grams with associated log levels — 620

| Word | Score |
|---|---|
| error | 100% error |
| can't/cannot | 50% warning, 50% error |
| unable to find | 80% error, 20% warning |
| finished | 20% trace, 38% debug, 40% info, 2% warn |

612 — Word row
614 — error row
616 — can't/cannot row
618 — unable to find / finished rows

710 sentiments associated with log levels — 720

| Log level | Typical sentiment |
|---|---|
| info | neutral or positive (-10% to 100%) |
| warning | slight negative (-40% to 0%) |
| error | slight or severe negative (-100% to -30%) |

712 — Log level row
714 — info row
716 — warning row

FIG. 7

810 logger.log(Level.INFO, "Error Writing CAS");

820
1) Presence of non-negated word "error" triggers a high-confidence suggestion that message is ERROR.
2) words "Writing" and "CAS" do not provide any reliable hints
3) Scan of other applications shows that the form "Error<verb>" is 99% classified as ERROR
4) No bad grammar - no hints
5) Highly negative sentiment again suggested ERROR Conclusion: The high confidence answer from Step 3 ultimately moves this message from INFO to Error

FIG. 8

910 logger.log ( Level.WARN, "Mapping verification finished");

920

1) Word "finished" rarely shown in WARN messages, never in ERROR, often in INFO/DEBUG. This generates a slight suggestion to lower the severity.
2) words "verification" and "mapping" provide no hints
3) No grammatical errors - provides no hints
4) Sentiment analysis is all positive. This generates a slight suggestion to lower the severity.
5) Context that this message is not a catch block/if-else block, again suggestion the message is not a warning.

Conclusion: Based on suggestions from steps 1,4, and 5, the message moves from WARN to INFO

FIG. 9

1010 logger.log ( Level.WARN, "Can't insert evidence trail: Entity Primary key is not available!");

1020

1) Presence of "can't" and "not available" suggest WARN/ERROR.
2) "Evidence trail" gives no hint
3) Negative sentiment suggests WARN/ERROR.

Conclusion: Message is already at WARN, system thinks WARN or ERROR is appropriate, since the original level is one of the suggestions (based on associated log levels of FIG. 6) the system will not change the message level.

FIG. 10

APPLYING CONSISTENT LOG LEVELS TO APPLICATION LOG MESSAGES

BACKGROUND

Technical Field

The present invention relates generally to computing systems, and more specifically, to analyzing log message content and reclassifying the log level or severity of the log message based on natural language processing (NLP) analysis.

Description of the Related Art

In order to provide support services for computing systems, one would require a trace record of all of the activities which have occurred at a node or machine. For personal computers operating in standalone fashion, such tracking or recording of actions may be realistic. Some computer code does provide for the continual logging and tracing of all activities, typically using a log component, as well as a tracer. Should an error occur and an error message be generated, then there exists a complete record of activities which may be pulled up by a debug program and may be reviewed to determine the source of the problem. If such a logging and/or tracing record exists, it eliminates the need for a customer to recreate the issue, a process which is unpredictable and time-consuming. The log record provides both a time frame and a task or entity identification of the source of the error.

SUMMARY

In accordance with an embodiment of the present principles, a computer-implemented method is provided for analyzing log message content. The computer-implemented method includes the step of detecting, by the at least one processor, log messages in an application code. The computer-implemented method further includes the steps of identifying a log level assigned to each of the log messages and performing natural language processing (NLP) analysis on each of the log messages by using at least keyword and synonym matching percentage analysis criteria. The computer-implemented method further includes the steps of determining, in response to the NLP analysis, a severity score of each of the log messages and reclassifying, based on the severity score, the assigned log level of one or more of the log messages to a different log level.

In accordance with another embodiment of the present principles, a system for analyzing log message content is provided. The system includes a memory and a processor in communication with the memory, wherein the processor is configured to detect log messages in an application code, identify a log level assigned to each of the log messages, perform natural language processing (NLP) analysis on each of the log messages by using at least keyword and synonym matching percentage analysis criteria, determine, in response to the NLP analysis, a severity score of each of the log messages, and reclassify, based on the severity score, the assigned log level of one or more of the log messages to a different log level.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 6 is a sample table assigning severity scores to common words found in log messages of application code, in accordance with an embodiment of the present principles;

FIG. 7 is a sample table assigning sentiments to common words found in log messages of application code, in accordance with an embodiment of the present principles;

FIG. 8 is an example log message found in application code having an "INFO" log level designation, the log message analyzed in accordance with the tables of FIGS. 6 and 7, where the "INFO" designation has been reclassified, in accordance with an embodiment of the present principles;

FIG. 9 is an example log message found in application code having a "WARN" log level designation, the log message analyzed in accordance with the tables of FIGS. 6 and 7, where the "WARN" designation has been reclassified, in accordance with an embodiment of the present principles;

FIG. 10 is an example log message found in application code having a "WARN" log level designation, the log message analyzed in accordance with the tables of FIGS. 6 and 7, where the "WARN" designation has been maintained, in accordance with an embodiment of the present principles.

DETAILED DESCRIPTION

The present principles are directed to systems and methods for analyzing log message content. In some embodiments, the present principles provide systems, methods and computer program products to perform static analysis of logging or log statements/messages in conjunction with programming models to determine the relative importance of each log message and the appropriate log level to assign to each message. Messages are analyzed for both content and context so that messages of similar importance are logged at the same level.

The systems and methods provide for consistent log levels across an application code despite differing individual coding styles across a team. Additionally, there is no need for manual intervention in setting log levels. The log levels are automatically reclassified or reset by log level reclassification software that applies natural language processing (NLP) analysis. The NLP analysis may include syntax analysis, semantics analysis, contextual analysis, and/or sentiment analysis. One or more of these analyses may be applied to log messages of an application code. The syntax analysis, the semantics analysis, and the contextual analysis may involve the computation of a score, such as a severity score or log level score, that may be used in combination with a sentiment value to make a decision as to whether a log level should be reclassified or readjusted to a more accurate or consistent log level.

The systems and methods further provide for detecting, by the at least one processor, log messages in an application code, identifying a log level assigned to each of the log messages, performing NLP analysis on each of the log messages by using at least keyword and synonym matching percentage analysis criteria, determining, in response to the NLP analysis, a severity score of each of the log messages, and reclassifying, based on the severity score, the assigned log level of one or more of the log messages to a different log level. The NLP includes analyzing trigger words to sort log messages, syntax or grammar analysis, semantics analysis, and sentiment analysis. Additionally, the NLP performs content analysis of the log message itself to modify or change or readjust or reclassify log levels assigned by a user, e.g., such a programmer or coder.

Figure 1:
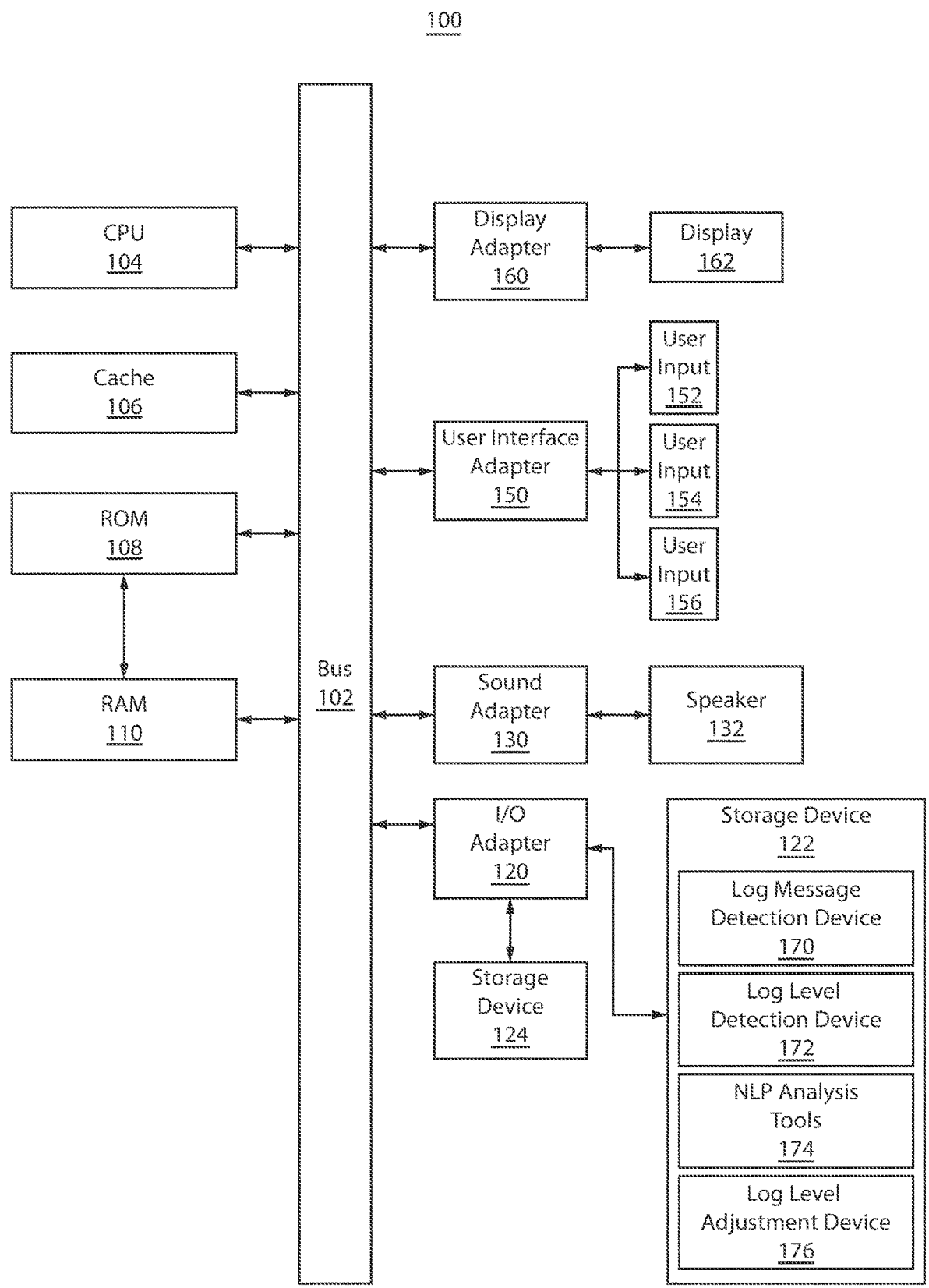
FIG. 1 is a block/flow diagram of an exemplary computing system for analyzing log message content, in accordance with an embodiment of the present principles.

Referring now to the drawings in which like numerals represent the same or similar elements and initially to FIG. 1, a block/flow diagram of an exemplary computing system for analyzing log message content is presented, in accordance with an embodiment of the present principles.

An exemplary log message content processing system 100 to which the present principles may be applied is shown in accordance with one embodiment. The log message content processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a log message detection device 170, a log level detection device 172, an NLP analysis tool 174, and a log level adjustment or reclassification device 176 for analyzing content of log messages. The log message detection device 170, the log level detection device 172, the NLP analysis tool 174, and the log level adjustment or reclassification device 176 may be associated with the storage device 122. Such devices 170, 172, 174, 176 need not be incorporated within the storage device 122. Such devices 170, 172, 174, 176 may be external to the storage device 122. One skilled in the art may contemplate different system and networking configurations for incorporating the devices 170, 172, 174, 176 therein.

A speaker 132 is operatively coupled to system bus 102 by the sound adapter 130. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 may be the same type of user input device or different types of user input devices. The user input devices 152, 154, and 156 are used to input and output information to and from the log message content processing system 100.

Of course, the log message content processing system 100 may also include other elements (not shown), as readily contemplated by one of skill in the art, as well as omit certain elements. For example, various other input devices and/or output devices may be included in the log message content processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the log message content processing system 100 are readily contemplated by one of ordinary skill in the art given the teachings of the present principles provided herein.

Figure 2:
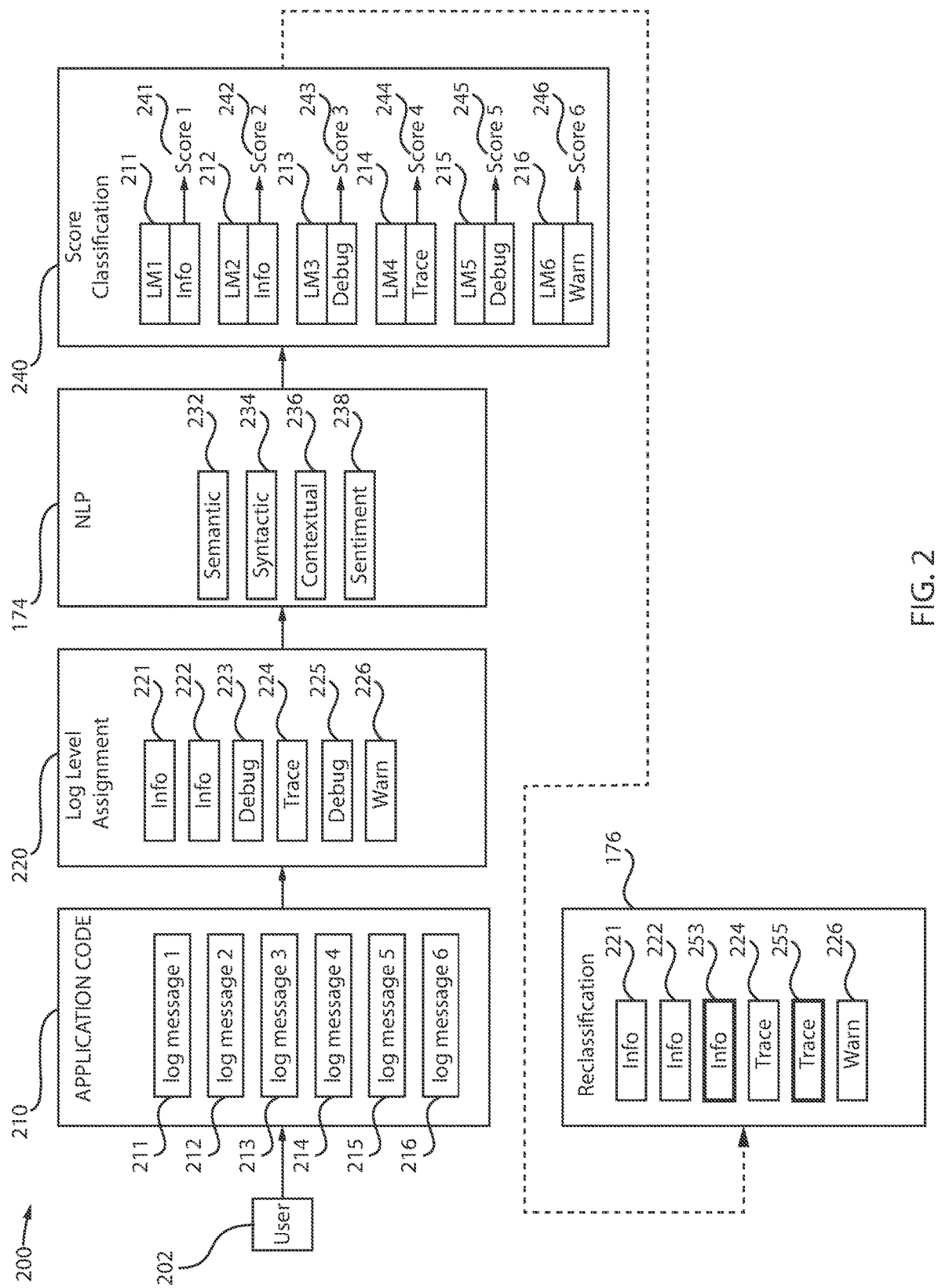
FIG. 2 is a block/flow diagram of an exemplary method for reclassifying log messages of application code of a single user, in accordance with an embodiment of the present principles.

FIG. 2 is a block/flow diagram of an exemplary method for reclassifying log messages of application code of a single user, in accordance with an embodiment of the present principles.

The system 200 includes a user 202, such as, e.g., a coder, a programmer, a developer, or a software engineer, for writing an application code 210. Application code 210 is code written specifically for an application created in a language, such as Java™ The application code 210 may include a plurality of log messages 211, 212, 213, 214, 215, 216 created or written by the user 202. A log message, in general, is a text string with an abundance of contextual information. Some of that information is passed to the logging calls through direct or default mechanisms with the rest being obtained from the operating system (OS) as part of the process of generating the log message at large.

In computing, a logfile is a file that records either events that occur in an OS or other software runs, or messages between different users of communication software. Logging is the act of keeping a log. In the simplest case, messages are written to a single logfile.

In one example, the user 202 may have created, e.g., six (6) log messages 211, 212, 213, 214, 215, 216 during the writing of the application code 210. The user 202 assigns a log level to each of the log messages. A log level assignment component 220 enables the user 202 to assign the "INFO" log level 221 to the first log message 211, the "INFO" log level 222 to the second log message 212, the "DEBUG" log level 223 to the third log message 213, the "TRACE" log level 224 to the fourth log message 214, the "DEBUG" log level 225 to the fifth log message 215, and the "WARN" log level 226 to the sixth log message 216. Therefore, each of the log messages created or written by the user 202 are assigned a log level. Some of the most common log levels are "TRACE," "DEBUG," "INFO," "WARN," "ERROR," and "FATAL." One skilled in the art may contemplate using a number of other log levels.

The log messages 211, 212, 213, 214, 215, 216 and their log level assignments 221, 222, 223, 224, 225, 226 are received by the NLP analysis tool 174. The NLP analysis tool 174 performs at least semantic analysis 232, syntactic analysis 234, contextual analysis 236, and sentiment analysis 238.

NLP analysis tool 174 uses NLP, which is a field of computer science, artificial intelligence, and computational linguistics concerned with the interactions between computers and human natural languages. As such, NLP is related to the area of human-computer interaction. Several modern NLP algorithms are based on machine learning, especially statistical machine learning, which make soft, probabilistic decisions based on attaching real-valued weights to each input feature. Such statistical models have the advantage that they can express the relative certainty of many different possible answers rather than only one, producing more reliable results when such a model is included as a component of a larger system. Moreover, this system could also be implemented with rules-based NLP algorithms or a mix of rules-based and machine-learning NLP algorithms.

NLP must ultimately extract meaning (i.e., "semantics") from text by semantic analysis 232. The text analysis includes formal grammars that specify relationships between text units, such as parts of speech, such as nouns, verbs, and adjectives, and address syntax. One can extend grammars to address natural-language semantics by greatly expanding sub-categorization, with additional rules/constraints.

Another task of NLP includes sentiment analysis 238, which is used to extract subjective information usually from a set of documents, such as application code, to determine "polarity" about specific log messages. It is useful for identifying trends of log messages in an application code. Sentiment analysis 238 aims to determine the attitude of a speaker or a writer or coder with respect to some topic or the overall contextual polarity of a document, e.g., an application code. The attitude may be his or her judgment or evaluation, affective state (e.g., the emotional state of the coder when coding and writing log messages), or the intended emotional communication (e.g., the emotional effect the coder wishes to have on the reader of the code). A basic task in sentiment analysis 238 is classifying the polarity of a given text at the document, code, sentence, or feature/aspect level, whether the expressed opinion in a document, a code, a sentence or an entity feature/aspect is positive, negative, or neutral.

Statistical and machine learning involve development (or use) of algorithms that allow a program to infer patterns about example ("training") data, that in turn allows it to generalize, make predictions about new data. During the learning phase, numerical parameters that characterize a given algorithm's underlying model are computed by optimizing a numerical measure, typically through an iterative process. In general, learning can be supervised, e.g., each item in the training data is labeled with the correct answer, or unsupervised, where it is not, and the learning process tries to recognize patterns automatically (as in cluster and factor analysis).

Another task of NLP includes "N-gram" analysis. An "N-gram" is a sequence of N items, such as letters, words, or phonemes. Certain item pairs (or triplets, quadruplets, etc.) are likely to occur much more frequently than others. For example, in English words, U always follows Q, and an initial T is never followed by K (though it may be in another language). Given sufficient data, one may compute frequency-distribution data for all N-grams occurring in that data. Because the permutations increase dramatically with N, for example, English has $26^2$ possible letter pairs, $26^3$ triplets, and so on, N is restricted to a modest number. N-grams are a kind of multi-order Markov model: the probability of a particular item at the Nth position depends on the previous N−1 items, and can be computed from data. Once computed, N-gram data can be used for several purposes.

After the NLP analysis tool 174 analyzes the log messages 211, 212, 213, 214, 215, 216 and their log level assignments 221, 222, 223, 224, 225, 226 via the semantic analysis 232, syntactic analysis 234, contextual analysis 236, and sentiment analysis 238, a severity score may be computed for each of the log messages 211, 212, 213, 214, 215, 216 by a score classification component 240. The first log message 211 has a first score 241 (e.g., 80%), the second log message 212 has a second score 242 (e.g., 95%), the third log message 213 has a third score 243 (e.g., 30%), the fourth log message 214 has a fourth score 244 (e.g., 60%), the fifth log message 215 has a fifth score 245 (e.g., 40%), and the sixth log message 216 has a sixth score 246 (e.g., 99%). These scores 241, 242, 243, 244, 245, 246 are sent to the log level reclassification or adjustment device 176.

The log level reclassification or adjustment device 176 determines whether the log level assignments 221, 222, 223, 224, 225, 226 given to the log messages 211, 212, 213, 214, 215, 216 by the user 202 are accurate. In this example, the log level reclassification or adjustment device 176 determined that the first log level assignment 221 provided by the user 202 is correct or accurate, as the first score 241 is at 80%. Thus, the initial log level was not reassigned to another or different log level. In other words, the log level "INFO" was maintained. Further, it was determined that the second log level assignment 222, the fourth log level assignment 224, and the sixth log level assignment 226 provided by the user 202 are correct or accurate, as their respective scores 242, 244, and 246 indicate (e.g., 95%, 60%, 99%, respectively). In other words, the initial log levels "INFO," "TRACE," and "WARN" were maintained for the second, fourth, and sixth log messages 212, 214, 216, respectively.

In contrast, it was determined that the third log level assignment 223 and the fifth log level assignment 225 should be reclassified or readjusted to different log level designations. For example, the third log level assignment 223 received a severity score 243 of 30% and the fifth log level assignment 225 received a severity score 245 of 40%. Thus, the NLP analysis tools 174 determined that the log level assignments 223, 225 provided by the user 202 for the log messages 213, 215, respectively, are not accurate or inconsistent with other similar log level designations within the application code. The log level reclassification device 176 automatically changed the third log level assignment 223 of "DEBUG" to "INFO" log level 253 and changed the fifth log level assignment 225 of "DEBUG" to "TRACE" log level 255.

Consequently, log levels assigned to log messages within a code may be changed or modified or reclassified to a more accurate or correct or consistent log level based on one or more analyses performed on the log messages of the code itself. The system 200 of FIG. 2 uses severity scores or log level scores to make a reclassification decision. However, it is contemplated that sentiment values derived from the sentiment analysis 238 may also be used in conjunction or in tandem with the severity scores or log level scores to make a reclassification decision. Moreover, the content of the log messages 211, 212, 213, 214, 215, 216 may be compared to content of log messages derived from other application code written by others users/coders/developers. The comparison may reveal similarities and differences between content of the log messages of user 202 and content of the log messages of the other users. Such similarities and differences may be used as feedback, in combination with the sentiment values and the severity scores, to arrive at a reclassification decision for log levels of log messages 211, 212, 213, 214, 215, 216.

Figure 3:
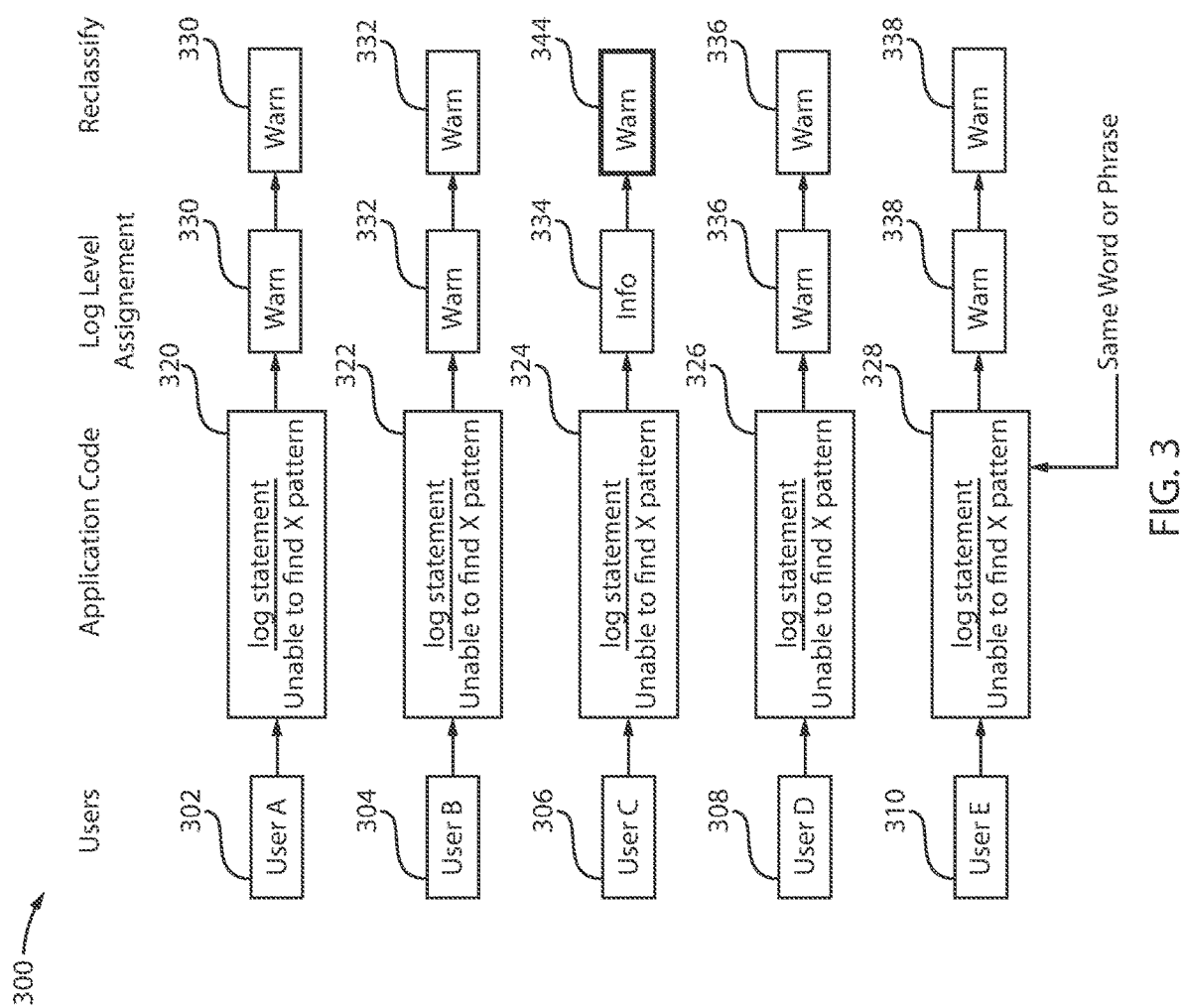
FIG. 3 is a block/flow diagram of an exemplary method for reclassifying log messages of application code of multiple users, the log messages including the same words or phrases, in accordance with an embodiment of the present principles.

FIG. 3 is a block/flow diagram of an exemplary method for reclassifying log messages of application code of multiple users, the log messages including the same words or phrases, in accordance with an embodiment of the present principles.

The system 300 includes a plurality of users, e.g., a first user 302, a second user 304, a third user 306, a fourth user 308, and a fifth user 310. Each of the users 302, 304, 306, 308, 310 may be writing, e.g., a portion of an application code and including log messages therein. For instance, the first user 302 may write a log message 320 including the text "unable to find X pattern." The second user 304 may write a log message 322 also including the text "unable to find X pattern." The third user 306 may write a log message 324 also including the text "unable to find X pattern." The fourth user 308 may write a log message 326 also including the text "unable to find X pattern." The fifth user 310 may write a log message 328 also including the text "unable to find X pattern." Therefore, each of the five users 302, 304, 306, 308, 310 wrote a log message 320, 322, 324, 326, 328, respectively, that was exactly the same (i.e., included the same word or the same phrase).

The first user 302 assigned a "WARN" log level 330 to the log message 320. The second user 304 assigned a "WARN" log level 332 to the log message 322. The third user 306 assigned an "INFO" log level 334 to the log message 324. The fourth user 308 assigned a "WARN" log level 336 to the log message 326. The fifth user 310 assigned a "WARN" log level 338 to the log message 328. Therefore, four (4) users 302, 304, 308, 310 assigned the same log level (i.e., "WARN") to log messages having the same word or text or phrase. In contrast, one (1) user 306 assigned a different log level (i.e., "INFO") to that same log message having the same text or word or phrase.

Such information may be fed to the log level adjustment or reclassification device 176 which either changes or maintains the log level assignments 330, 332, 334, 336, 338 made by the users 302, 304, 306, 308, 310, respectively. In this example, the log level adjustment or reclassification device 176 maintained the log level assignments 330, 332, 336, 338 of the first, second, fourth, and fifth users 302, 304, 308, 310, and reclassified or adjusted or changed the third log level assignment 334 of the third user 306 to log level 344 designating the log message 324 as "WARN" to be consistent with the log level assignments used by the other users 302, 304, 308, 310.

Therefore, log levels across an application code written by multiple users may be made consistent, even when taking into account the different coding styles of each user of the team. The system 300 of FIG. 3 uses severity scores or log level scores to make a reclassification decision. However, it is contemplated that sentiment values derived from the sentiment analysis 238 may also be used in conjunction or in tandem with the severity scores or log level scores to make a reclassification decision. Moreover, the content of the log messages 320, 322, 324, 326, 328 may be compared to content of log messages derived from other application code written by others users/coders/developers. The comparison may reveal similarities and differences between content of the log messages of users 302, 304, 306, 308, 310. Such similarities and differences may be used as feedback, in combination with the sentiment values and the severity scores, to arrive at a reclassification decision for log levels of log messages 320, 322, 324, 326, 328.

Figure 4:
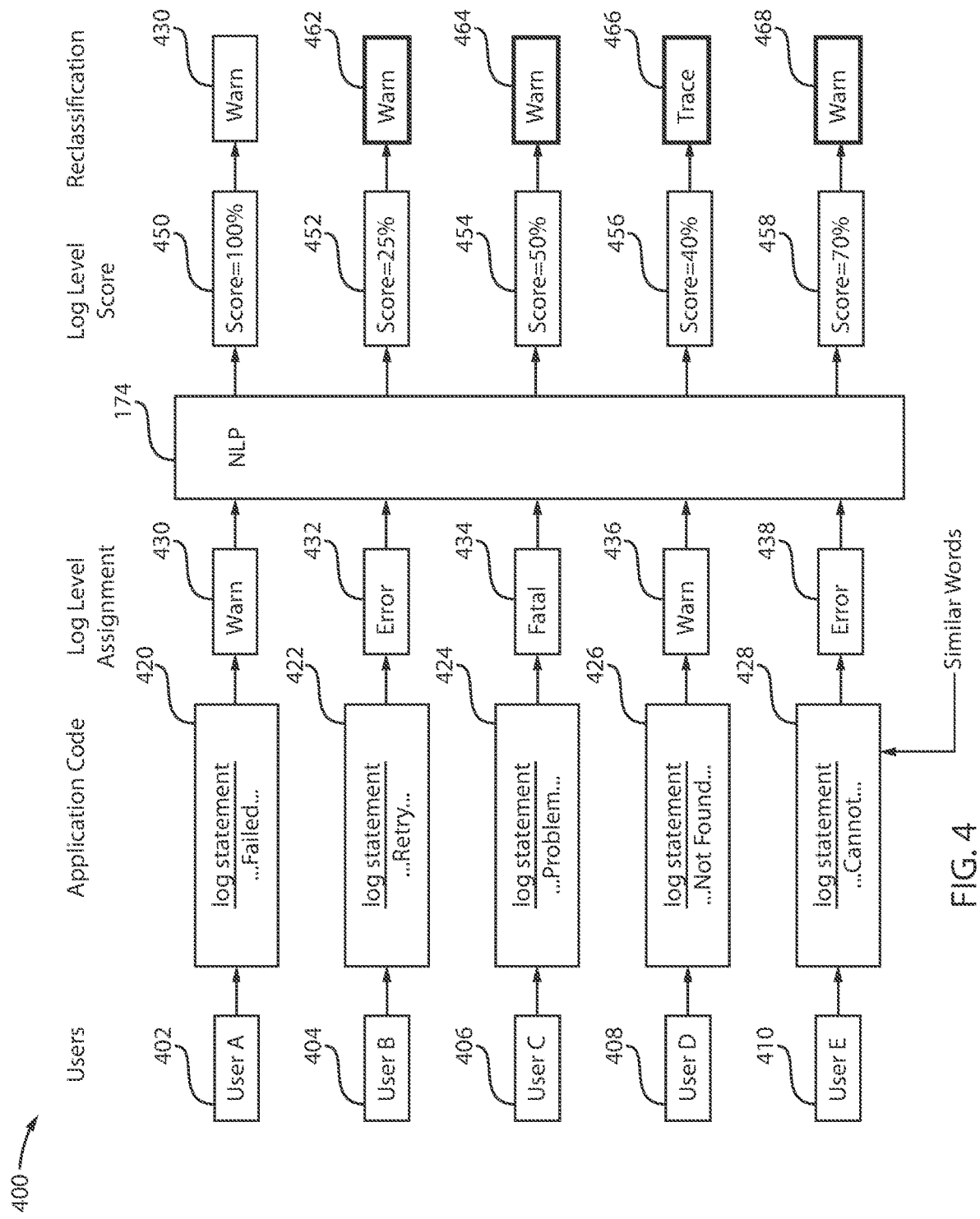
FIG. 4 is a block/flow diagram of an exemplary method for reclassifying log messages of application code of multiple users, the log messages including similar words or phrases, in accordance with an embodiment of the present principles.

FIG. 4 is a block/flow diagram of an exemplary method for reclassifying log messages of application code of multiple users, the log messages including similar words or phrases, in accordance with an embodiment of the present principles.

The system 400 includes a plurality of users, e.g., a first user 402, a second user 404, a third user 406, a fourth user 408, and a fifth user 410. Each of the users 402, 404, 406, 408, 410 may be writing, e.g., a portion of an application code and including log messages therein. For instance, the first user 402 may write a log message 420 including the word " . . . FAILED." The second user 404 may write a log message 422 including the word " . . . RETRY." The third user 406 may write a log message 424 including the word " . . . PROBLEM." The fourth user 408 may write a log message 426 including the words " . . . NOT FOUND." The fifth user 410 may write a log message 428 including the word " . . . ERROR." Therefore, each of the five users 402, 404, 406, 408, 410 wrote a log message 420, 422, 424, 426, 428, respectively, that included word or phrases that have a similar meaning or similar sentiment (e.g., a negative sentiment).

The first user 402 assigned a "WARN" log level 430 to the log message 420. The second user 404 assigned an "ERROR" log level 432 to the log message 422. The third user 406 assigned a "FATAL" log level 434 to the log message 424. The fourth user 408 assigned a "WARN" log level 436 to the log message 426. The fifth user 410 assigned an "ERROR" log level 438 to the log message 428.

Such information may be fed to the log level adjustment or reclassification device 176 which either changes or maintains the log level assignments 430, 432, 434, 436, 438 made by the users 402, 404, 406, 408, 410, respectively. In this example, the log level adjustment or reclassification device 176 maintains the log level assignment 430 of the first user 402, and reclassifies or adjusts or changes the second, third, fourth, and fifth log level assignments 432, 434, 436, 438 of the remaining users 404, 406, 408, 410.

For example, concerning the log level 430 of the first log message 420, the severity score 450 calculated by the NLP tool 174 came back at, e.g., 100%. Thus, the reclassification device 176 need not change the log level of the first log message 420. Concerning the log level 432 of the second log message 422, the severity score 452 calculated by the NLP tool 174 came back at, e.g., 25%. Thus, the reclassification device 176 automatically changed or reclassified the log level 432 to log level 462 designating a "WARN" log level, which is more accurate or consistent with other log messages. Concerning the log level 434 of the third log message 424, the severity score 454 calculated by the NLP tool 174 came back at, e.g., 50%. Thus, the reclassification device 176 automatically changed or reclassified the log level 434 to log level 464 designating a "WARN" log level, which is more accurate or consistent, and more in line with what was written in the first and second log messages 420, 422. The "problem" indication in log message 424 is more in line with the "failed" and "retry" indications of log messages 420, 422.

Concerning the log level 436 of the fourth log message 426, the severity score 456 calculated by the NLP tool 174 came back at, e.g., 40%. Thus, the reclassification device 176 automatically changed or reclassified the log level 436 to log level 466 designating a "TRACE" log level, which is more accurate or consistent, and more in line with other log messages written by users 402, 404, 406, and 410. Concerning the log level 438 of the fifth log message 428, the severity score 458 calculated by the NLP tool 174 came back at, e.g., 70%. However, the reclassification device 176 automatically changed or reclassified the log level 438 to log level 468 designating a "WARN" log level, which is more accurate or consistent, and more in line with other log messages written by users 402, 404, 406. The "cannot" indication in log message 428 is more in line with the "failed," "retry," and "problem" indications of log messages 420, 422, 424.

Therefore, log levels across an application code written by multiple users may be made consistent, even when taking into account the different coding styles of each user of the team. Moreover, the text within the log messages of the application code of each user may be compared to extract similarities therefrom. If similar words are detected, for example, "failed," "retry," and "problem," then all such log messages may be designated with the same log level. For instance, all these words have a negative sentiment associated with them, or low severity score, and based on what the majority of users initially classified them as, the reclassification device may take that data/information into account when considering reclassification of the initial log levels.

The system 400 of FIG. 4 uses severity scores or log level scores to make a reclassification decision. However, it is contemplated that sentiment values derived from the sentiment analysis 238 (FIG. 2) may also be used in conjunction or in tandem with the severity scores or log level scores to make a reclassification decision. Moreover, the content of the log messages 420, 422, 424, 426, 428 may be compared to content of log messages derived from other application code written by others users/coders/developers. The comparison may reveal similarities and differences between content of the log messages of users 402, 404, 406, 408, 410 with other users/coders/developers writing other application code. Such similarities and differences may be used as feedback, in combination with the sentiment values and the severity scores, to arrive at a reclassification decision for log levels of log messages 420, 422, 424, 426, 428.

For example, other coders within the organization may have already written dozens of other application codes having thousands of log messages, each log message including a number of different text combinations. Such text of the log messages has already been analyzed with the NLP tools 174 discussed herein and provide for a plethora of information as to what log levels the organization prefers to use for certain types of words or phrases or text.

Figure 5:
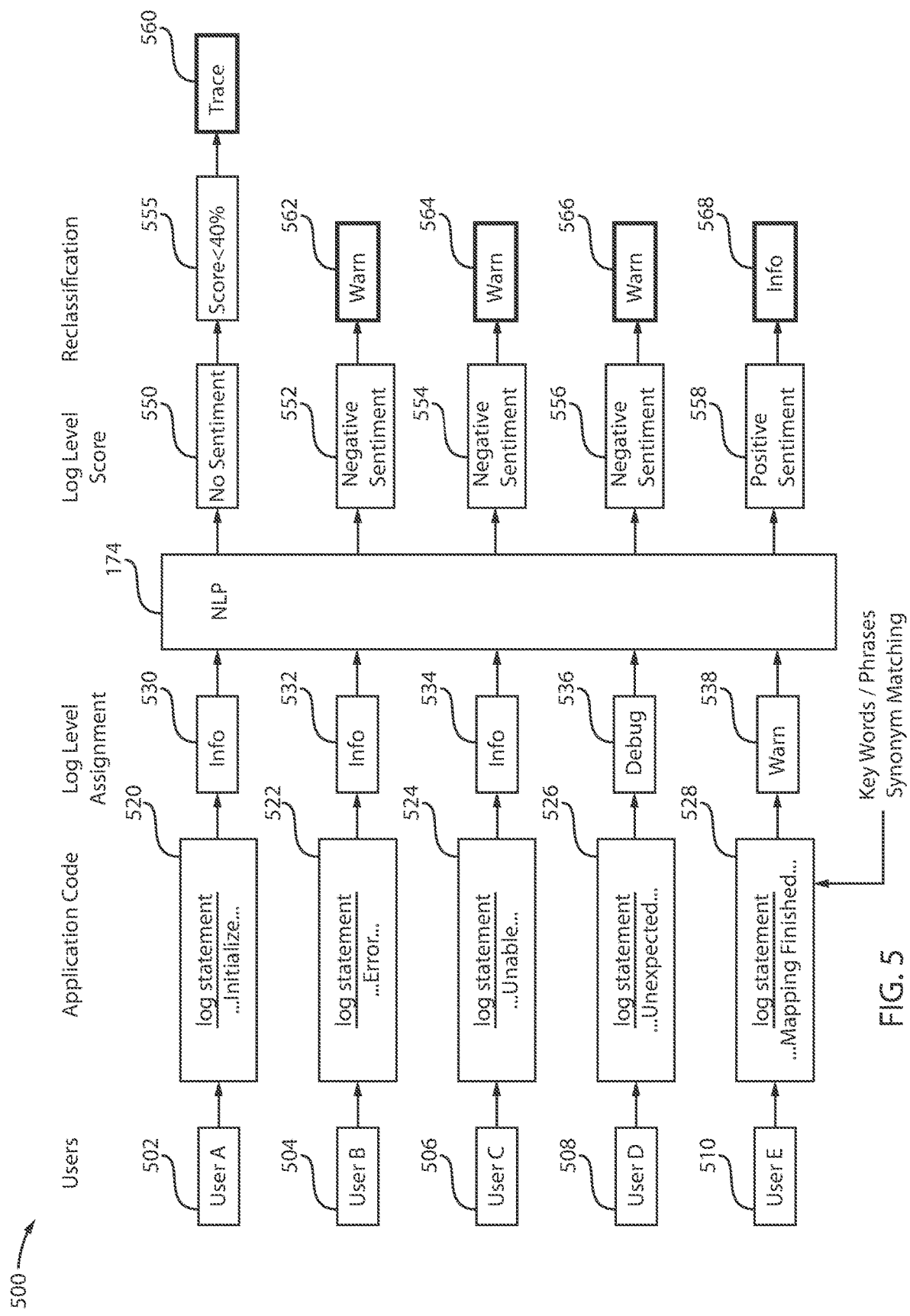
FIG. 5 is a block/flow diagram of an exemplary method for reclassifying log messages of application code of multiple users, the log messages analyzed by sentiment analysis, in accordance with an embodiment of the present principles.

FIG. 5 is a block/flow diagram of an exemplary method for reclassifying log messages of application code of multiple users, the log messages analyzed by sentiment analysis, in accordance with an embodiment of the present principles.

The system 500 includes a plurality of users, e.g., a first user 502, a second user 504, a third user 506, a fourth user 508, and a fifth user 510. Each of the users 502, 504, 506, 508, 510 may be writing, e.g., a portion of an application code and including log messages therein. For instance, the first user 502 may write a log message 520 including the word " . . . INITIALIZE." The second user 504 may write a log message 522 including the word " . . . ERROR." The third user 506 may write a log message 524 including the word " . . . UNABLE." The fourth user 508 may write a log message 526 including the word " . . . UNEXPECTED." The fifth user 510 may write a log message 528 including the word " . . . FINISHED." Therefore, each of the five users 502, 504, 506, 508, 510 wrote a log message 520, 522, 524, 526, 528, respectively, that included word or phrases that have a similar meaning or similar sentiment or no sentiment at all.

The first user 502 assigned an "INFO" log level 530 to the log message 520. The second user 504 assigned an "INFO" log level 532 to the log message 522. The third user 506 assigned an "INFO" log level 534 to the log message 524. The fourth user 508 assigned a "DEBUG" log level 536 to the log message 526. The fifth user 510 assigned a "WARN" log level 538 to the log message 528.

Such information may be fed to the log level adjustment or reclassification device 176 which either changes or maintains the log level assignments 530, 532, 534, 536, 538 made by the users 502, 504, 506, 508, 510, respectively. In this example, the log level adjustment or reclassification device 176 changes or reclassifies all the log level assignments 530, 532, 534, 536, 538.

For example, concerning the log level 530 of the first log message 520, since there was no sentiment 550 regarding any of the words or phrases used in the log message 520, the severity score 555 calculated by the NLP tool 174 came back at less than, e.g., 40%. Thus, the reclassification device 176 decided to automatically change the log level of the first log message 520 to a "TRACE" log level 560. It is noted that a combination of a severity score and a sentiment value were used to arrive at the conclusion that reclassification should take place for the log message 520.

Concerning the log level 532 of the second log message 522, the NLP tool 174 indicated a negative sentiment 552. Thus, the reclassification device 176 automatically changed or reclassified the log level 532 to log level 562 designating a "WARN" log level, which is more accurate or consistent with other log messages. It seems that for this example code, negative connotations are simply designated with the "WARN" log level by, e.g., the lead coder. Concerning the log level 534 of the third log message 524, the NLP tool 174 indicated a negative sentiment 554. Thus, the reclassification device 176 automatically changed or reclassified the log level 534 to log level 564 designating a "WARN" log level, which is more accurate or consistent with other log messages, and more in line with what was written in the second log messages 522. The "UNABLE" indication in log message 524 is more in line with the "ERROR" indication of log message 522, both indicting some level of negativity (i.e., negative sentiment).

Concerning the log level 536 of the fourth log message 526, the NLP tool 174 indicated a negative sentiment 556.

Thus, the reclassification device 176 automatically changed or reclassified the log level 536 to log level 566 designating a "WARN" log level, which is more accurate or consistent with other log messages, and more in line with other log messages written by users 504, 506. Concerning the log level 538 of the fifth log message 528, the NLP tool 174 indicated a positive sentiment 558. In response thereto, the reclassification device 176 automatically changed or reclassified the log level 538 to log level 568 designating an "INFO" log level, which is more accurate, and more in line with other log messages (not shown) written by users 402, 404, 406, which may have included some text or words or phrases having positive connotations. It seems that for this example code, positive connotations are simply designated with the "INFO" log level by, e.g., the lead coder.

Therefore, log levels across an application code written by multiple users may be made consistent, even when taking into account the different coding styles of each user of the team. Moreover, the text within the log messages of the application code of each user may be compared to extract similarities therefrom. If words having similar sentiments are detected, for example, "error," "unable," and "unexpected," then all such log messages may be designated with the same log level. For instance, all these words have a negative sentiment associated with them, or low severity score, and based on what the majority of users initially classified them as, the reclassification device may take that data/information into account when considering reclassification of the initial log levels. Of course, the reclassification may be initiated by one or more lead coders that want to provide for more general consistency between log messages written by different coders.

FIG. 6 is a sample table assigning severity scores to common words found in log messages of application code, in accordance with an embodiment of the present principles.

The table 600 includes, e.g., a word column 610 and a score column 620. The word column 610 may include, e.g., the words or phrases, "ERROR" 612, "CAN'T/CANNOT" 614, "UNABLE TO FIND" 616, and "FINISHED" 618. The word "ERROR" 612 may be assigned a score of, e.g., 100% that the log level is "ERROR." The words "CAN'T/CANNOT" may be assigned a score of, e.g., 50% that the log level is "WARN" and 50% that the log level is "ERROR." The phrase "UNABLE TO FIND" 616 may be assigned a score of, e.g., 80% that that log level is "ERROR" and 20% that the log level is "WARN." The word "FINISH" 618 may be assigned a score of, e.g., 20% that the log level is "TRACE," 38% that the log level is "DEBUG," 40% that the log level is "INFO," and 2% that the log level is "WARN." Therefore, a look-up table (LUC) may be consulted or accessed when different words or phrases can be assigned to multiple log levels. Each word or phrase may be provided with a percentage of what log level may be assigned thereto.

FIG. 7 is a sample table assigning sentiments to common words found in log messages of application code, in accordance with an embodiment of the present principles.

The table 700 includes, e.g., a log level column 710 and a sentiment column 720. The log level column may include, e.g., the log levels "INFO" 712, "WARN" 714, and "ERROR" 716. The log level "INFO" 712 may be assigned a neutral or positive sentiment (e.g., −10% to 100%). The log level "WARN" 714 may be assigned a slight negative sentiment (e.g., −40% to 0%). The log level "ERROR" 716 may be assigned a slight or severe negative sentiment (e.g., −100% to −30%). Therefore, a look-up table (LUC) may be consulted or accessed when different words or phrases can be assigned to multiple log levels. Each word or phrase may be provided with a sentiment percentage of what log level may be assigned thereto.

It is noted that the NLP analysis tool 174 may consult or access both of the tables 600 and 700 of FIGS. 6 and 7 to determine severity scores and/or sentiments in order to provide advice to the log level reclassification device 176. Of course, the tables 600 and 700 are merely exemplary tables. One skilled in the art may contemplate creating tables with a plurality of different words, a plurality of different assigned percentages, and a plurality of different log levels. These tables 600, 700 may be updated by a lead coder every, e.g., week, or every, e.g., month, or every time, e.g., a new application code is written by the team.

FIG. 8 is an example log message found in application code having an "INFO" log level designation, the log message analyzed in accordance with the tables of FIGS. 6 and 7, where the "INFO" designation has been reclassified, in accordance with an embodiment of the present principles.

The example log message 810 includes the log level "INFO" and some text stating "Error Writing CAS." Performing NLP analysis 820 to the log message 810 reveals that the presence of the non-negated word "error" triggers a high-confidence suggestion that the log message should have a log level of "ERROR." The words "Writing" and "CAS" do not provide any reliable hints at to a specific log level. A scan or comparison of other application codes shows that the form "Error <verb>" is 99% classified as "ERROR." Additionally, the word "ERROR" has a highly negative sentiment associated with it. In conclusion, the high confidence answers resulting from the analysis 820 ultimately moves or reclassifies this log level from "INFO" to "ERROR."

FIG. 9 is an example log message found in application code having a "WARN" log level designation, the log message analyzed in accordance with the tables of FIGS. 6 and 7, where the "WARN" designation has been reclassified, in accordance with an embodiment of the present principles.

The example log message 910 includes the log level "WARN" and some text stating "Mapping verification finished." Performing NLP analysis 920 to the log message 910 reveals that the word "finished" is rarely shown in "WARN" messages, never in "ERROR" messages, and often in either "INFO" or "DEBUG" messages. This generates a slight suggestion to lower the log level severity. The words "verification" and "mapping" provide no hints at to severity or sentiment. Sentiment analysis, in this case, is all positive. Thus, this also generates a slight suggestion to lower the severity of the log level. Moreover, context shows that this message is not in a catch block/if-else block, and, thus, suggesting that the message does not warrant a "WARN" log level. Based on this analysis 920, the log level moves or is reclassified from "WARN" to "INFO."

FIG. 10 is an example log message found in application code having a "WARN" log level designation, the log message analyzed in accordance with the tables of FIGS. 6 and 7, where the "WARN" designation has been maintained, in accordance with an embodiment of the present principles.

The example log message 1010 includes the log level "WARN" and some text stating "Can't insert evidence trail: entity primary key is not available." Performing NLP analysis 1020 to the log message 1010 reveals that the presence of the words "can't" and "not available" suggest "WARN" and/or "ERROR" log levels. Other words in the text of the log message 1010 provide no hints as to severity score or sentiment. The words "can't" and "not available" suggest negative sentiment. The log message has a log level of "WARN" set by the user, and the NLP analysis 1020 returns either a "WARN" or an "ERROR" log event as being the most appropriate. Since the original log level is one of the suggestions proposed by the NLP, the reclassification device 176 does not change or modify or reclassify the log level of log message 1010.

Figure 11:
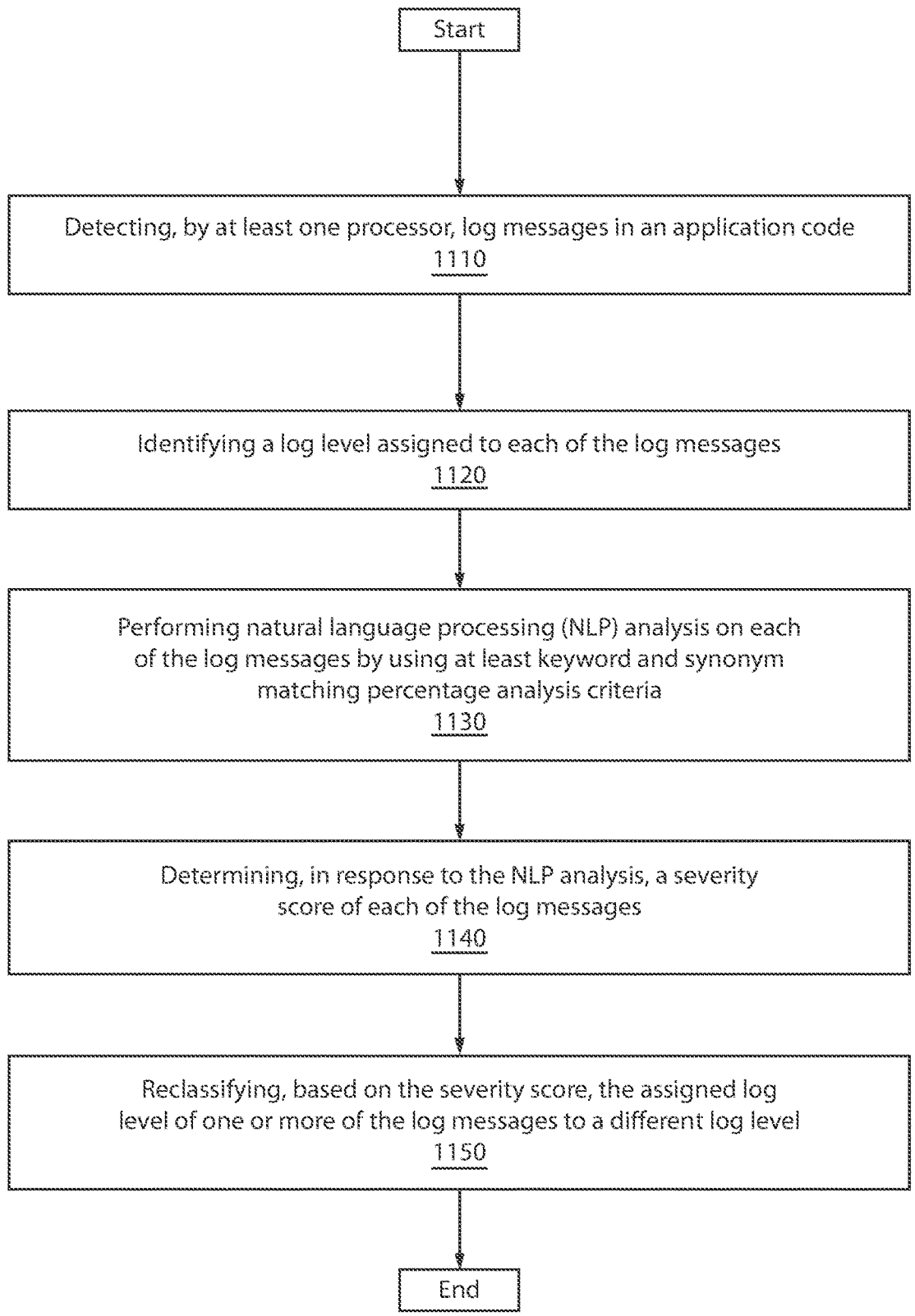
FIG. 11 is a block/flow diagram of an exemplary method for analyzing log message content by using NLP analysis tools to reclassify log levels assigned to log messages, in accordance with an embodiment of the present principles.

FIG. 11 is a block/flow diagram of an exemplary method for analyzing log message content by using NLP analysis tools to reclassify log levels assigned to log messages, in accordance with an embodiment of the present principles.

At block 1110, log messages are detected in an application code by at least one processor.

At block 1120, a log level assigned to each of the log messages is identified.

At block 1130, NLP analysis is performed on each of the log messages by using at least keyword and synonym matching percentage analysis criteria.

At block 1140, in response to the NLP analysis, a severity score is determined for each of the log messages.

At block 1150, based on the severity score, the assigned log level of one or more messages is reclassified to a different log level.

In one or more embodiments, bad grammar or misspelled words in the log messages may also be taken into account when determining a log level.

Still yet, any of the components of the present invention could be created, integrated, hosted, maintained, deployed, managed, serviced, etc. by a service supplier who offers to provide a method for analyzing log message content. Thus, the present invention discloses a process for deploying, creating, integrating, hosting, maintaining, and/or integrating computing infrastructure, including integrating computer-readable code into the computer system 100 (FIG. 1), wherein the code in combination with the computer system 100 is capable of performing a method for providing a method for analyzing log message content with respect to a product or service. In another embodiment, the invention provides a business method that performs the process steps/blocks of the invention on a subscription, advertising, and/or fee basis. That is, a service supplier, such as a Solution Integrator, could offer to provide a method for analyzing log message content with respect to a product or service. In this case, the service supplier can create, maintain, support, etc. a computer infrastructure that performs the process steps/blocks of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a machine having at least one processor, a memory, and a communication platform for analyzing log message content, the method comprising:
   detecting log messages in an application code;
   identifying a log level assigned to each of the log messages by a user, via a log level assignment component;
   performing natural language processing (NLP) analysis on each of the log messages, via an NLP analysis tool, by employing training data in combination with at least keyword and synonym matching percentage analysis criteria; and
   determining, in response to the NLP analysis, a severity score of each of the log messages via a score classification component, the severity score used in combination with a sentiment value to evaluate the assigned log level to establish whether the assigned log level requires reclassification to a different log level designation and modify a designation of the assigned log level when a reclassification decision has been affirmed.

2. The method of claim 1, further comprising comparing content of the log messages with content of log messages derived from other application code written by other users.

3. The method of claim 2, wherein the compared content reveal log similarities and differences that are fed back into the NLP analysis tool to bolster the training data.

4. The method of claim 1, further comprising outputting reclassified log messages to an interface of a computing device.

5. The method of claim 1, further comprising using an integrated development environment (IDE) to reclassify the assigned log level of one or more of the log messages.

6. The method of claim 1, further comprising applying a learning model to each of the log messages detected in the application code.

7. The method of claim 1, wherein a look-up table is employed to assign severity scores to common words found in the log messages.

8. The method of claim 1, wherein a look-up table is employed to assign sentiments to common words found in the log messages.

9. The method of claim 1, further comprising analyzing each of the log messages for content and context.

10. The method of claim 1, wherein the keyword and synonym matching percentage analysis criteria include positive and negative sentiment determination of each of the log messages of the application code.

11. A non-transitory computer readable storage medium comprising a computer readable program for analyzing log message content, wherein the computer readable program when executed on a computer causes the computer to perform the steps of:

detecting log messages in an application code;

identifying a log level assigned to each of the log messages by a user, via a log level assignment component;

performing natural language processing (NLP) analysis on each of the log messages, via an NLP analysis tool, by employing training data in combination with at least keyword and synonym matching percentage analysis criteria; and determining, in response to the NLP analysis, a severity score of each of the log messages via a score classification component, the severity score used in combination with a sentiment value to evaluate the assigned log level to establish whether the assigned log level requires reclassification to a different log level designation and modify a designation of the assigned log level when a reclassification decision has been affirmed.

12. The non-transitory computer readable storage medium of claim 11, further comprising comparing content of the log messages with content of log messages derived from other application code written by other users.

13. The non-transitory computer readable storage medium of claim 12, wherein the compared content reveal log similarities and differences that are fed back into the NLP analysis tool to bolster the training data.

14. The non-transitory computer readable storage medium of claim 11, further comprising outputting reclassified log messages to an interface of a computing device.

15. The non-transitory computer readable storage medium of claim 11, further comprising using an integrated development environment (IDE) to reclassify the assigned log level of one or more of the log messages.

16. The non-transitory computer readable storage medium of claim 11, further comprising applying a learning model to each of the log messages detected in the application code.

17. The non-transitory computer readable storage medium of claim 11, wherein a look-up table is employed to assign severity scores to common words found in the log messages.

18. The non-transitory computer readable storage medium of claim 11, wherein a look-up table is employed to assign severity scores to common words found in the log messages.

19. The non-transitory computer readable storage medium of claim 11, further comprising analyzing each of the log messages for content and context.

20. A computer system for analyzing log message content, the computer system comprising:

a memory; and a processor in communication with the memory, wherein the processor is configured to:

detect log messages in an application code;

identify a log level assigned to each of the log messages by a user, via a log level assignment component;

perform natural language processing (NLP) analysis on each of the log messages, via an NLP analysis tool, by employing training data in combination with at least keyword and synonym matching percentage analysis criteria; and determine, in response to the NLP analysis, a severity score of each of the log messages via a score classification component, the severity score used in combination with a sentiment value to evaluate the assigned log level to establish whether the assigned log level requires reclassification to a different log level designation and modify a designation of the assigned log level when a reclassification decision has been affirmed.

* * * * *